(12) United States Patent
Drihem et al.

(10) Patent No.: US 9,210,128 B2
(45) Date of Patent: Dec. 8, 2015

(54) FILTERING OF APPLICATIONS FOR ACCESS TO AN ENTERPRISE NETWORK

(71) Applicant: Check Point Software Technologies Ltd., Tel-Aviv (IL)

(72) Inventors: Lior Drihem, Givat Shmuel (IL); Amnon Perlmutter, Givataim (IL)

(73) Assignee: CHECK POINT SOFTWARE TECHNOLOGIES LTD., Tel-Aviv (IL)

( * ) Notice: Subject to any disclaimer, the term of this patent is extended or adjusted under 35 U.S.C. 154(b) by 18 days.

(21) Appl. No.: 13/902,820

(22) Filed: May 26, 2013

(65) Prior Publication Data

US 2014/0123269 A1  May 1, 2014

Related U.S. Application Data

(60) Provisional application No. 61/718,233, filed on Oct. 25, 2012, provisional application No. 61/749,333, filed on Jan. 6, 2013.

(51) Int. Cl.
H04L 29/06 (2006.01)

(52) U.S. Cl.
CPC ........ H04L 63/0272 (2013.01); H04L 63/0236 (2013.01); H04L 63/0245 (2013.01)

(58) Field of Classification Search
CPC .............. H04L 63/101; H04L 63/0236; H04L 63/0428; G06F 21/56
USPC ........................................................ 726/15
See application file for complete search history.

(56) References Cited

U.S. PATENT DOCUMENTS

| | | | | |
|---|---|---|---|---|
| 6,850,943 | B2* | 2/2005 | Teixeira et al. | 1/1 |
| 7,027,414 | B2* | 4/2006 | Walsh et al. | 370/316 |
| 7,467,205 | B1* | 12/2008 | Dempster et al. | 709/224 |
| 7,797,752 | B1* | 9/2010 | Vaidya et al. | 726/27 |
| 8,341,724 | B1* | 12/2012 | Burns | H04L 63/0428 370/235 |
| 2004/0088536 | A1* | 5/2004 | Lim et al. | 713/151 |
| 2004/0148501 | A1* | 7/2004 | Livaditis et al. | 713/161 |
| 2005/0102514 | A1* | 5/2005 | Bergenwall | H04L 63/0227 713/168 |
| 2005/0273850 | A1* | 12/2005 | Freund | H04L 63/0227 726/14 |
| 2006/0026682 | A1* | 2/2006 | Zakas | 726/22 |
| 2006/0143710 | A1* | 6/2006 | Desai et al. | 726/23 |
| 2008/0282080 | A1* | 11/2008 | Hyndman | H04L 41/5003 713/150 |
| 2009/0296702 | A1* | 12/2009 | Stevens et al. | 370/389 |
| 2010/0154032 | A1* | 6/2010 | Ollmann | G06F 21/552 726/3 |
| 2011/0277013 | A1* | 11/2011 | Chinta | 726/1 |
| 2012/0030731 | A1* | 2/2012 | Bhargava et al. | 726/3 |
| 2012/0311659 | A1* | 12/2012 | Narain et al. | 726/1 |
| 2013/0117561 | A1* | 5/2013 | Chawla | H04L 29/06 713/158 |
| 2014/0007228 | A1* | 1/2014 | Ngair | G06F 21/56 726/22 |

* cited by examiner

*Primary Examiner* — Izunna Okeke
*Assistant Examiner* — Bryan Wright
(74) *Attorney, Agent, or Firm* — Mark M. Friedman

(57) ABSTRACT

A computer-readable storage medium has embedded thereon non-transient computer-readable code for controlling access to a protected computer network, by intercepting packets that are being exchanged between a computer system and the protected network, and then, for each intercepted packet, identifying the associated application that is running on the computer system, determining whether the application is trusted, for example according to a white list or according to a black list, and disposing of the packet accordingly.

16 Claims, 1 Drawing Sheet

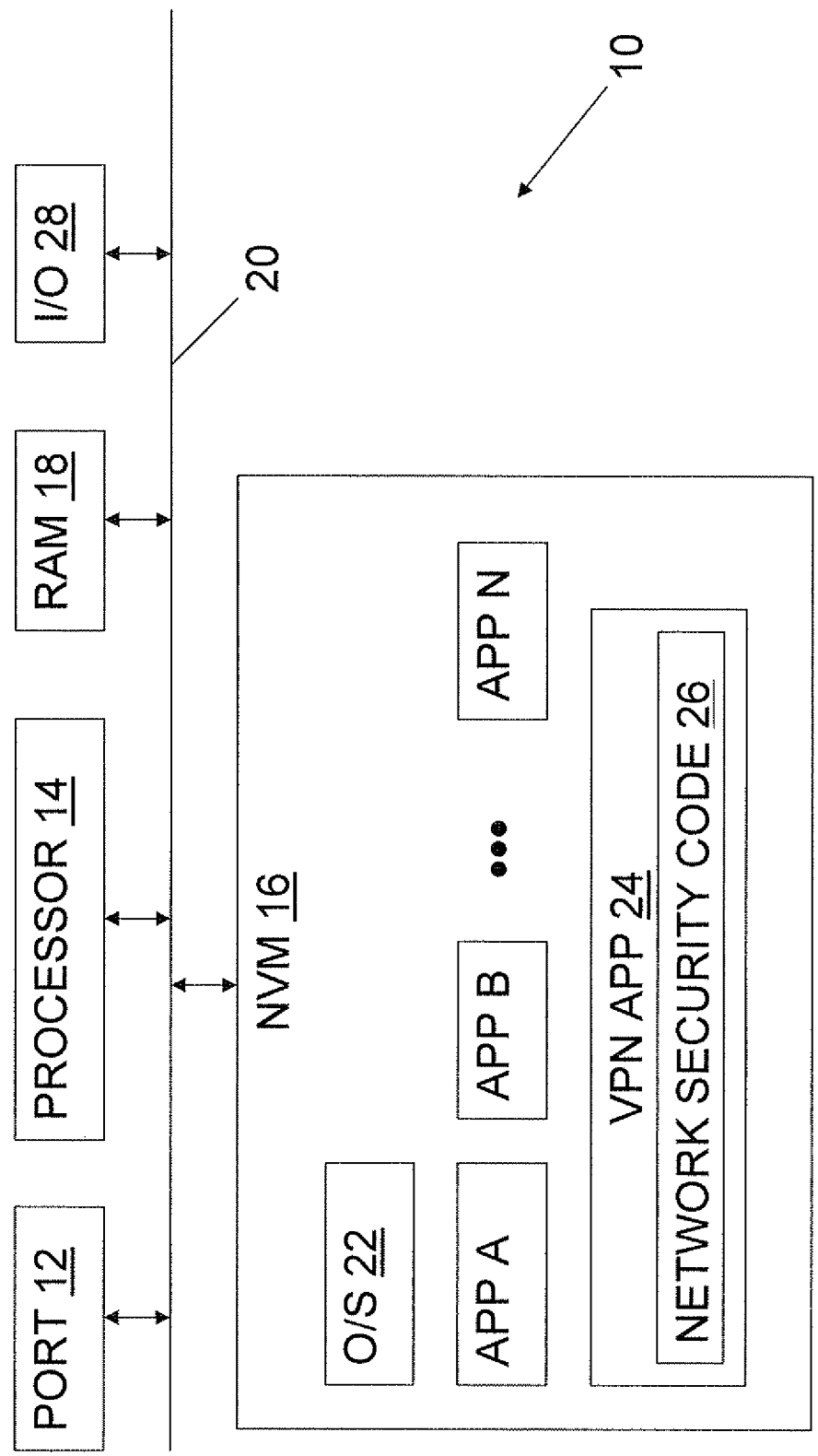

FILTERING OF APPLICATIONS FOR ACCESS TO AN ENTERPRISE NETWORK

FIELD AND BACKGROUND OF THE INVENTION

The present invention relates to enterprise network security and, more particularly, to a method of censoring access to an enterprise's internal network from employees' private devices.

Recently the Bring Your Own Device (BYOD) trend has been gaining momentum. Employees are bringing personally-owned mobile devices to their place of work, and using those devices to access privileged company information technology resources such as email, file servers and databases as well as their own personal applications and data.

The security of company data assets is one of the major concerns in the BYOD scenario. These concerns include:
1. Authentication and authorization—how the company authenticates that the device is used by an authorized user and the user authenticates that s/he indeed is connected into the company network (as opposed to a malicious spoofer).
2. Encryption of traffic over the various networks (wireless and others) that connect the device to company network to prevent eavesdropping of the transmitted data.
3. Encryption of the data stored on the device in case the device is lost or stolen.
4. Preventing or reducing risk of malware application ("App") and other unauthorized Apps running on the device
4. Preventing or reducing risk of malware application ("App") and other unauthorized Apps running on the device A common conventional security practice to address some of these security concerns includes one or more of the following measures:
1. Authentication, authorization and encryption of traffic using a VPN (Virtual Private Network) tunnel (IPSec (Internet Protocol Security) or SSL (Secure Sockets Layer))—usually a designated App is used to establish an authenticated VPN tunnel. This designated App then encrypts all IP packets that are destined to the company network according to the VPN tunnel parameters and decrypts packets that are received from the company network.
2. Malware risk reduction is done using Mobile Device Management (MDM) software that includes an agent that company management installs in the user's device. MDM software decides via a white list (or a black list) which applications the device can run, and also applies other security measures, such as requiring the user of the device to enter a PIN code in order to use the device, and remotely erasing all (factory reset) or some (e.g. all contents of an external storage card) of the data stored in the device.

While the first measure mentioned above (VPN tunnel) that secures access to company's network is usually perceived as a reasonable security step by employees—a step that takes place only when the employee wants to use the device to access to the company network, the second measure (MDM etc.) is more intrusive: it limits an employee's control over his/her own purchased devices (e.g. limiting which Apps the employee is allowed to install), changes his/her user experience (PIN code) and potentially erases his/her own private data. If as a result (to keep the employees happy) a company is implementing only the first measure without implementing the second measure, the company is left in a situation in which employees can access company network from their devices but the malware risk is not reduced—for example a malware application running on an employee's device can make use of the VPN tunnel of the first measure to access sensitive company resources or to inflict other damage.

It would be highly advantageous to have a method of configuring employees' mobile devices to enable the employees to use these devices for business purposes without compromising the security of the company's information technology resources.

SUMMARY OF THE INVENTION

According to the present invention there is provided a computer-readable storage medium having non-transient computer-readable code embodied on the computer-readable storage medium, the computer-readable code for controlling access to a protected computer network, the computer-readable code including: (a) program code for intercepting packets that are being exchanged between a computer system and the protected computer network; and (b) program code for: for each packet: (i) identifying an application, that is running on the computer system, that is associated with the each packet, (ii) determining whether the application is trusted, and (iii) disposing of the each packet in accordance with the determining.

According to the present invention there is provided a computer system including: (a) a port; (b) a plurality of application modules that are operative to exchange packets with a protected computer network via the port; and (c) a network security module for: (i) intercepting the packets, and (ii) for each packet: (A) identifying which application module is associated with the each packet, (B) determining whether the application module, that is associated with the each packet, is trusted, and (C) disposing of the each packet in accordance with the determining.

A computer-readable storage medium of the present invention has embedded thereon non-transient computer-readable code for controlling access to a protected computer network from a computer system. Included in the computer-readable code are program code for intercepting packets that are being exchanged between the computer system and the protected computer network (either being sent from the computer system to the protected computer network or being received by the computer system from the protected computer network), and program code for filtering the packets. For each intercepted packet, the filtering code identifies an application, if any, that is running on the computer system and that is associated with the packet, either as a source of the packet or as a destination of the packet. The filtering code determines whether that application is trusted, and then disposes of the packet in accordance with whether the application has been determined to be trusted. (A packet for which the filtering code fails to identify an associated application is treated as a packet that is associated with an untrusted application.)

The meaning of the term "disposing" of a packet, as understood herein, includes all the network security measures that are performed in response to the determination of whether the packet is trusted, whether or not those security measures operate directly on the packet itself. So, for example, the scope of the term "disposing" includes e.g. logging the attempt by the application to send or receive the packet Preferably, the application is identified either by mapping the packet header to the application or by mapping the packet header to a process that is run by the application.

Preferably, the determination of whether the application is trusted includes comparing a property of the application, such as the name of the application, the application identifier, and/or a hash checksum of binary code of the application, to either a white list or a black list of such a property. Most preferably, the computer-readable code also includes program code for receiving updates of the white list or of the black list.

For a packet that is being sent from the computer system to the protected computer network by a trusted application, preferably the disposition of the packet includes forwarding the packet to its destination in the protected computer network, for example via a virtual private network.

For a packet that is being sent from the computer system to the protected computer network by a trusted application, preferably the disposition of the packet includes encrypting the packet.

For a packet that is being received from the protected computer network at the computer system by a trusted application, preferably the disposition of the packet includes allowing the application to process the packet.

For a packet that is being received from the protected computer network at the computer system by a trusted application, preferably the disposition of the packet includes decrypting the packet.

Preferred methods of disposing of a packet that is associated with an untrusted application include dropping the packet, terminating a TCP connection (if any) of which the packet is a part, requesting a validation of the packet, and logging the attempt by the application to exchange the packet with the protected computer network.

For a packet that is being sent from the computer system to the protected computer network by an untrusted application, preferably the disposition of the packet includes routing the packet to a network other than the protected computer network.

For a packet that is being sent from the computer system to the protected computer network by a trusted application, alternatively the disposition of the packet includes tagging the packet for further processing in the protected computer network.

The scope of the present invention also includes a computer system that includes a port, a plurality of application modules that exchange packets with a protected computer network via the port, and a network security module that implements the packet interception and application filtering described above for the program code of the computer-readable storage medium. Preferably, the network security module is a sub-module of a communication module that supports the packet exchange, for example via a virtual private network tunnel. IPSec and SSL are noted above as examples of such tunnel protocols. Other such examples include PPTP (Point-to-Point Tunneling Protocol), GRE (Generic Routing Encapsulation), OpenVPN and CIPE (Crypto Internet Protocol Encapsulation).

The present invention differs from conventional MDM insofar as the present invention is directed at filtering packets that are exchanged, or that are intended to be exchanged, with the protected computer network, e.g. via a VPN tunnel, and is confined to such filtering. For example, the computer system is free to run Apps that are listed on a blacklist; the computer system is only forbidden to exchange packets between those Apps and the protected computer network. The present invention may be implemented by itself or along with conventional MDM. In the case of joint implementation of both the present invention and conventional MDM in the same computer system, the present invention controls which packets are exchanged with the protected computer network while the MDM controls which Apps are allowed to be active.

BRIEF DESCRIPTION OF THE DRAWINGS

Various embodiments are herein described, by way of example only, with reference to the accompanying drawings, wherein:

The sole FIGURE is a high-level partial block diagram of a user device configured according to the present invention.

DESCRIPTION OF THE PREFERRED EMBODIMENTS

The principles and operation of enterprise network security according to the present invention may be better understood with reference to the drawings and the accompanying description.

Referring now to the drawings, the FIGURE is a high-level partial block diagram of a user device 10 of the present invention. Device 10 typically is a mobile device such as a tablet computer or a smartphone, but also could be a desktop computer or a laptop computer. Only the components of device 10 that are germane to the present invention are shown in the FIGURE. Device 10 includes a port 12, a processor 14, a non-volatile memory (NVM) 16, a random access memory 18 and miscellaneous conventional input and output devices 28 such as a touch screen (in a tablet computer or a smartphone) or a keyboard, a mouse and a display screen (in a desktop computer or a laptop computer), all communicating with each other via a bus 20. In NVM 16 are stored code of an operating system (O/S) 22, a set of Apps (A through N) and one more App: a VPN App 24 for establishing an authenticated VPN tunnel to a protected network of an enterprise and for communicating with the protected network through the VPN tunnel via port 12. VPN App 24 includes network security code 26 of the present invention for censoring, as described below, how the other Apps communicate with the protected network. Network security code 26 may be embedded in the VPN module itself of VPN App 24 or may be coded separately from the VPN module itself of VPN App 24. It is not obligatory for code 26 to be part of App 24: in other embodiments, code 26 is a freestanding App of its own. If code 26 is a freestanding App, then it should have its own independent ability to inspect packets that are sent by device 10 to the protected network via the VPN tunnel; methods for doing this are known in the art and need not be presented here.

When device 10 boots, processor 14 executes boot code (not shown) to load O/S 22 from NVM 16 into RAM 18 and then executes O/S 22 in RAM 18 to operate device 10. A user of device 10 who wishes to communicate with the protected network uses I/O 28 to instruct device 10, via the execution of O/S 22 by processor 14, to load. VPN App 24 from NVM 16 into RAM 18 and to execute the code of VPN App 24 in RAM 18. When a user of device 10 uses I/O 28 to select an App for device 10 to run, processor 14 executes the relevant code of O/S 22 to load the App code from NVM 16 into RAM 18 and then executes the App code in RAM 18. If the App attempts to communicate with the protected network, network security code 26 censors that attempt.

NVM 16 is an example of a computer-readable storage medium bearing computer-readable code for implementing the enterprise network security methodology described herein. Other examples of such computer-readable storage media include read-only memories such as CDs bearing such code.

The FIGURE illustrates an embodiment of a user device of the present invention in which the App modules and network security module 26 are implemented in software. In other embodiments of a user device of the present invention, the App modules and/or network security module 26 may be implemented in firmware or in hardware.

Network security module 26 is installed in device 10 by the employer of the user/owner of device 10, i.e., by the management of the enterprise whose computer network is to be protected by network security module 26.

The functioning of network security module 26 now will be explained.

When VPN App 24 receives a clear packet from O/S 22 to encrypt over the VPN tunnel or an encrypted packet to decrypt and pass to back to O/S 22 (and a receiving App) network security module 26 checks if the App that the packet is sent from (in case of an outgoing packet) or destined to (in case of an incoming packet) is allowed.

In order to do this, network security module 26 must be able to identify the App associated with the packet. Usually, O/S 22 includes one or more Application Program Interfaces (APIs) that may be used for this purpose. One example of such an API is the netstat command of Unix-like operating systems. If O/S 22 is a Linux O/S then the /proc file system of O/S 22 can be queried directly by network security module 26 without the use of an API.

The purpose of this API (or similar mechanism) is to map the relevant fields of the packet header, a 5-tuple of <IP protocol, source IP address, source port, destination IP address, destination port> to an App or to one of the running processes of the App (after identifying the process ID it is possible to get the full path name of the executed binary). The API may require some or all of the fields in this 5-tuple.

Note that only OSI layer 3 IP packets are filtered. Non-IP frames at OSI layer 2 (such as ARP) are not affected. Neither are other protocols that cannot be directly mapped to a specific App running under O/S 22—such as DNS, ICMP, DHCP and that are due to different services running on the device on behalf of the Apps.

Network security module 26 is configured (either from the VPN gateway, from the cloud or by any other configuration technique) with a list of Apps that are allowed to connect to the protected network over the VPN tunnel.

This list can be set explicitly (only specific Apps are allowed), by groups of Apps that are allowed (e.g. all business App-s, identified e.g. by their App identifiers all having a common prefix), or as a list of Apps or groups of Apps that are not allowed while others are allowed—in other words, either by white listing or by black listing.

The list of allowed or forbidden Apps can be updated by a service in the cloud or by a management server that is part of the VPN gateway that VPN App 24 connects to.

Apps can be identified in a white list or in a black list by name (executable full path name or partial name), by the App identifier, and/or by a hash checksum (md5sum, sha1, other techniques calculated over the binary file of the App). Generally, Apps are identified by their identifiers on mobile devices 10 and by their full path names, optionally supplemented by hashes, on other devices 10. As Apps are updated it may be that more than one checksum hash value is defined for a single App. Different sets of values may be required for different types and versions of O/S 22.

If network security module 26 is unable to identify the App associated with a packet, the packet is treated as being associated with a forbidden App. The policy for treating packets that are associated with forbidden. Apps is established by the management of the enterprise whose computer network is protected by network security module 26. Usually, packets that are associated with forbidden Apps are merely dropped.

If the App is allowed then the processing continues in the normal way—encrypting an outgoing packet and sending the packet through the tunnel, or allowing a decrypted incoming packet to be sent to the App it is destined to.

If the App is not allowed then network security module 26 can apply different actions on this packet, in order to mitigate the risk as configured in the enterprise policy. These actions include one or mre of the following.

a. Silently drop the packet.
    b. (If the packet is part of a TCP connection) send a TCP Reset packet to actively terminate the TCP connection.
    c. Hold the packet and generate an interaction with the user to ask for his/her validation.
    d. Generate a log to send to a log server. The log may include statistics such as the volume of data sent and received and the numbers of packets sent and received. Administrators later can inspect the list of Apps used by their remote users.
    e. Reroute the packet. A useful option here is to reroute the packet outside of the VPN tunnel, so the packet is sent clear instead of being sent via the VPN tunnel to the protected enterprise network and thus effectively will not reach the VPN tunnel. This option is mostly useful for Application-based split tunneling. This option can also be useful in situations when there are collisions between network address translation in the encryption domain of the VPN and in the IP addresses of the local network that device 10 accesses directly.
    f. Tagging the packet inside the VPN tunnel so a different network component, such as a gateway or server that terminates the VPN tunnel, will perform one or more of operations a-e.

Different actions may be assigned for application to different Apps and groups of Apps.

In an enterprise with diverse kinds of employees, different policies can be assigned to different employees or to different devices 10 of the same employee.

To speed up the performance of the App censoring described above, the results of the mapping between a 5-tupple and the App, or the decision of what to do with that App, can be stored in RAM 18 in an efficient data-structure such as a hash-table.

The security provided by the present invention is based on the quality of the mapping between the packet that is destined to be sent on the VPN tunnel (or that has been received from the VPN tunnel) and the App that sent it (or that it is destined for in the inbound case). The limitations are:

1. Such a mapping is not always available—as in the case of services that run on the device on behalf of other App-s. In this case the level of security depends on the security of these services.

2. The level of separation between App-s that O/S 22 provides: the extent to which O/S 22 allows other Apps to send packets with the same 5-tuple as is already being used by one of the Apps. Normally, on a non "jail-broken" device, the Apps must use a socket to transmit such packets and O/S 22 will not allow this ambiguity to arise.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A non-transitory computer-readable storage medium having non-transient computer-readable code embodied on the computer-readable storage medium, the computer-readable code for controlling access to a protected computer network, the computer-readable code comprising:
    (a) program code for intercepting packets that are being exchanged between a computer system and the protected computer network; and
    (b) program code for: for each said packet:
        (i) identifying an application, that is running on said computer system, that is associated with said each packet,
        (ii) determining whether said application is trusted, and
        (iii) disposing of said each packet in accordance with said determining, wherein
        said identifying uses a process identification (PID) of one of the running processes of the application;
        said each packet is being sent by said computer system to the protected computer network, and wherein, if said determining determines that said application is not trusted, then said disposing includes:
(A) routing said each packet to a network other than the protected computer network; and
(B) tagging said each packet for further processing in the protected computer network;
if said each packet is being sent from said computer system to the protected computer network and said determining determines that said application is trusted, then said disposing includes encrypting said each packet; and
if said each packet is being received by said computer system from the protected computer network and said determining determines that said application is trusted, then said disposing includes decrypting said each packet.

2. The computer-readable storage medium of claim 1, wherein said identifying is effected by steps including mapping a header of said each packet to said application.

3. The computer-readable storage medium of claim 1, wherein said identifying is effected by steps including mapping a header of said each packet to a process that is run by said application.

4. The computer-readable storage medium of claim 1, wherein said determining is effected by steps including comparing a property of said application to an application property white list.

5. The computer-readable storage medium of claim 4, wherein said property is selected from the group consisting of a name of said application, an identifier of said application and a hash checksum of binary code of said application.

6. The computer-readable storage medium of claim 4, further comprising:
(c) program code for receiving updates of said application property white list.

7. The computer-readable storage medium of claim 1, wherein said determining is effected by steps including comparing a property of said application to an application property black list.

8. The computer-readable storage medium of claim 7, wherein said property is selected from the group consisting of a name of said application, an identifier of said application and a hash checksum of binary code of said application.

9. The computer-readable storage medium of claim 7, further comprising:
(c) program code for receiving updates of said application property black list.

10. The computer-readable storage medium of claim 1, wherein said each packet is being sent from said computer system to the protected computer network, and wherein, if said determining determines that said application is trusted, then said disposing includes forwarding said each packet to a destination thereof in the protected computer network.

11. The computer-readable storage medium of claim 10, wherein said forwarding is via a virtual private network.

12. The computer-readable storage medium of claim 1, wherein said each packet is being received by said computer system from the protected computer network, and wherein, if said determining determines that said application is trusted, then said disposing includes allowing said application to process said each packet.

13. The computer-readable storage medium of claim 1, wherein, if said determining determines that said application is not trusted, then said disposing includes at least one action selected from the group consisting of:
(A) dropping said each packet;
(B) if said each packet is part of a TCP connection: terminating said TCP connection;
(C) requesting a validation of said each packet; and
(D) logging an attempt by said application to exchange said each packet with the protected computer network.

14. A computer system comprising:
(a) a port;
(b) a plurality of application modules that are operative to exchange packets with a protected computer network via said port; and
(c) a network security interface configured to:
(i) intercept said packets, and
(ii) for each said packet:
(A) identify which said application module is associated with said each packet using a process identification (PID) of one of the running processes of the application module;
(B) determine whether said application module, that is associated with said each packet, is trusted, and
(C) dispose of said each packet in accordance with said determining wherein
said each packet is being sent by the computer system to the protected computer network, and wherein, if said determining determines that said application module is not trusted, then said disposing includes:
(A) routing said each packet to a network other than the protected computer network; and
(B) tagging said each packet for further processing in the protected computer network;
if said each packet is being sent from said computer system to the protected computer network and said determining determines that said application is trusted, then said disposing includes encrypting said each packet; and
if said each packet is being received by said computer system from the protected computer network and said determining determines that said application is trusted, then said disposing includes decrypting said each packet.

15. The computer system of claim 14, wherein said network security module is a sub-module of a communication module for supporting said exchanging of said packets.

16. The computer system of claim 15, wherein said communication module supports said exchanging via a virtual private network.

* * * * *